United States Patent [19]

O'Shaughnessy et al.

[11] 3,940,375

[45] Feb. 24, 1976

[54] ARYLENE SULFIDE POLYMERS

[75] Inventors: Marion T. O'Shaughnessy; Robert W. Campbell, both of Bartlesville, Okla.

[73] Assignee: Phillips Petroleum Company, Bartlesville, Okla.

[22] Filed: Nov. 7, 1974

[21] Appl. No.: 521,775

[52] U.S. Cl................................ 260/79.1; 260/79
[51] Int. Cl.².................................. C08G 75/16
[58] Field of Search........................... 260/79, 79.1

[56] References Cited
UNITED STATES PATENTS 3,274,165  9/1966  Lenz et al.............................. 260/79

3,547,887  12/1970  Gabler et al........................... 260/47

OTHER PUBLICATIONS

Lenz et al., Journal of Polymer Science, Vol. 58, pp. 351–367, (1962).

*Primary Examiner*—Melvyn I. Marquis

[57] ABSTRACT

A method is provided for producing arylene sulfide polymers employing (1) alkali metal salts of halothiophenols, (2) organic amides, and (3) dihalo aromatic compounds.

8 Claims, No Drawings

ARYLENE SULFIDE POLYMERS

BACKGROUND OF THE INVENTION

This invention pertains to the production of arylene sulfide polymers.

In one of its more specific aspects, this invention pertains to a novel method of producing polymers such as those produced by the method of U.S. Pat. No. 3,354,129 and other processes for producing arylene sulfide polymers. In U.S. Pat. No. 3,354,129, is disclosed a method of producing polymers from polyhalo-substituted aromatics, alkali metal sulfides and polar organic compounds. There have been numerous other methods set forth using similar reactants to produce arylene sulfide polymers including using an alkali metal salt of a halothiophenol as sulfur source in the polymerization. It has now been discovered that in a method for preparing arylene sulfide polymers using an alkali metal salt of a halothiophenol as a sulfur source the molecular weight of the polymer produced can be increased and the yield of polymer increased by the selection of reactants brought together with the alkali metal salt of a halothiophenol under conditions for producing a polymer.

In accordance with this invention, in the production of an arylene sulfide polymer from an alkali metal salt of a halothiophenol in an organic amide, the presence of a dihalo aromatic compound in the reaction mixture results in polymer in higher yield and with higher molecular weight than in production conducted without the presence of a dihalo aromatic compound.

Alkali metal salts of halothiophenols which can be used in the process of this invention can be represented by the formula XRSM, where R is a divalent hydrocarbon radical selected from arylene, alkyl-substituted arylene, cycloalkyl-substituted arylene, and aryl-substituted arylene, the number of carbon atoms in said R group being within the range of six to about twenty; X is a halogen selected from fluorine, chlorine, bromine, and iodine; and M is an alkali metal selected from lithium, sodium, potassium, rubidium, and cesium. If desired, the alkali metal salts of the halothiophenols can be produced, without isolation, in the polymerization reactor, e.g., by reaction of the corresponding halothiophenol with an alkali metal hydroxide.

Examples of some applicable alkali metal salts of halothiophenols which can be employed in the process of this invention include sodium salt of 1-chloro-4-mercaptobenzene (sodium salt of p-chlorothiophenol), lithium salt of 1-methyl-2-bromo-4-mercaptobenzene, potassium salt of 1-ethyl-2-isopropyl-4-fluoro-5-mercaptobenzene, rubidium salt of 1-butyl-2-hexyl-3-chloro-4-mercaptobenzene, sodium salt of 1-decyl-2-bromo-4-mercaptobenzene, cesium salt of 1-tetradecyl-3-iodo-5-mercaptobenzene, sodium salt of 1-bromo-2-cyclohexyl-4-mercaptobenzene, potassium salt of 1-phenyl-2-chloro-3-mercaptobenzene, sodium salt of 1-fluoro-4-mercaptonaphthalene, potassium salt of 4-chloro-4'-mercaptobiphenyl, and the like, and mixtures thereof.

Dihalo aromatic compounds which can be used in the process of this invention can be represented by the formula XRX, where R and each X are as defined above and wherein each X can be the same or different halogens.

Examples of some applicable dihalo aromatic compounds which can be employed in the process include p-dichlorobenzene, m-dichlorobenzene, c-dibromobenzene, 1-chloro-4-bromobenzene, 2,4-dichlorotoluene, 1-ethyl-2-isopropyl-4,5-diiodobenzene, 1-butyl-2-hexyl-3,4-difluorobenzene, 1-decyl-2,4-dichlorobenzene, 1-tetradecyl-3,5-diiodobenzene, 2-cyclopentyl-1,4-difluorobenzene, 1-phenyl-2,3-dibromobenzene, 1,4-dibromonaphthalene, 4,4'-dichlorobiphenyl, and the like, and mixtures thereof.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

When the alkali metal salt of the halothiophenol is produced in the polymerization reactor, e.g., by reaction of the corresponding halothiophenol with an alkali metal hydroxide, it is preferable, although not necessary, that water be added to facilitate salt formation. When water is present in substantial amount, e.g., from addition of water as such or by production during formation of the alkali metal salt of the halothiophenol, it is preferable, although not necessary, that at least most of the water be removed, e.g., by distillation, prior to addition of the dihalo aromatic compound.

Although the molar ratio of dihalo aromatic compound to alkali metal salt of halothiophenol can vary over a wide range, this ratio generally will be within the range of about 0.005:1 to about 0.1:1, preferably about 0.01:1 to about 0.05:1. The amount of organic amide can vary over a wide range but generally will be within the range of about 100 grams to about 2500 grams per gram-mole of alkali metal salt of halothiophenol.

The temperature at which the polymerization is conducted can vary over a wide range but generally will be within the range of about 125°C to about 450°C, preferably about 175°C to about 350°C. The reaction time also can vary considerably, depending in part on the reaction temperature, but generally will be within the range of about 10 minutes to about 3 days, preferably about 1 hour to about 8 hours. The reaction can be conducted at a variety of pressures, but the reaction pressure should be sufficient to maintain the organic amide and the dihalo aromatic compound substantially in the liquid phase.

The arylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer, optionally with additional washing with methanol or the like.

The arylene sulfide polymers produced by the process of this invention can be blended with fillers, pigments, extenders, other polymers, and the like. They can be cured through crosslinking and/or chain extension, e.g., by heating at temperatures up to about 480°C in the presence of a free oxygen-containing gas, to provide cured products having high thermal stability and good chemical resistance. They are useful in the production of coatings, films, molded objects, and fibers.

EXAMPLES

In the following Examples, values for inherent viscosity were determined at 206°C in 1-chloronaphthalene at a polymer concentration of 0.4 g/100 ml solution. Values for glass transition temperature (Tg) and crystalline melting point ($T_m$) were determined on premelted and quenched polymer samples by differential thermal analysis. Values for polymer-melt temperature (PMT) were determined by placing the polymer samples on a heated bar with a temperature gradient.

EXAMPLE I

In a control run outside the scope of this invention, to a stirred 1-liter autoclave were charged 144.6 g (1 mole) p-chlorothiophenol, 41.2 g (1 mole) sodium hydroxide, 36 g water, and 326.7 g N-methyl-2-pyrrolidone. The mixture was heated to 204°C with stirring under a slow nitrogen flush in 1 hour and 45 minutes, during which time there was collected 56 ml of distillate, including 6 ml of p-chlorothiophenol and 48.1 g of water. The mixture in the autoclave was allowed to cool to 175°C over a period of 1 hour and 15 minutes, after which the temperature was raised to 245°C over a period of 20 minutes. The mixture was then maintained at 245°C for 3 hours at a pressure of 40–75 psig, after which the mixture was cooled to about 25°C. The product was washed three times with hot water and five times with methanol, then allowed to stand overnight in methanol, filtered, and washed six more times with methanol. The product was dried in a vacuum oven at 80°C to provide 42.1 g (38.7 percent yield) of poly(p-phenylene sulfide) having an inherent viscosity of 0.02, a Tg of about 25°C, a $T_m$ of about 177°C, and a PMT of 155°C.

EXAMPLE II

In a run conducted in accordance with this invention, to a stirred 1-liter autoclave were charged 144.6 g (1 mole) p-chlorothiophenol, 41.2 g (1 mole) sodium hydroxide, 36 g water, and 300 g N-methyl-2-pyrrolidone. The mixture was heated to 205°C with stirring under a slow nitrogen flush in 2 hours and 10 minutes, during which time there was collected 54 ml of distillate, including about 1 ml of p-chlorothiophenol and 51.6 g of water. The mixture in the autoclave was allowed to cool to 175°C over a period of 1 hour and 25 minutes, at the end of which time 2.9 g (0.02 mole) p-dichlorobenzene and 26.7 g N-methyl-2-pyrrolidone were added. The temperature was then raised to 245°C over a period of 15 minutes. The mixture was maintained at 245°C for 3 hours at a pressure of 40–50 psig, after which the mixture was cooled to about 25°C. The product was washed seven times with hot water and six times with methanol and then dried in a vacuum oven at 80°C to provide 90.0 g (84.0 percent yield) of poly(p-phenylene sulfide) having an inherent viscosity of 0.04, a Tg of 36°C, a $T_m$ of 252°C, and a PMT of 241°C.

Thus, in this Example, in which a small amount of p-dichlorobenzene was employed, the yield of poly(p-phenylene sulfide) was much higher and the molecular weight, based on inherent viscosity, was considerably greater than those observed for the polymer produced in Example I.

It will be evident from the foregoing that various modifications can be made to the method of this invention, the essence of which is that the presence of a dihalo aromatic compound in a polymerization reaction mixture comprising an alkali metal salt of a halothiophenol in an organic amide results in polymer in higher yield and with higher molecular weight than production of polymer from an alkali metal salt of a halothiophenol in an organic amide conducted without the presence of a dihalo aromatic compound.

We claim:
1. A method for producing polymers comprising:
   a. contacting an alkali metal salt of a halothiophenol represented by the formula XRSM, where R is a divalent hydrocarbon radical selected from arylene, alkyl-substituted arylene, cycloalkyl-substituted arylene, and aryl-substituted arylene, the number of carbon atoms in said R group being within the range of 6 to about 20; X is halogen selected from fluorine, chlorine, bromine, and iodine; and M is an alkali metal selected from lithium, sodium, potassium, rubidium, and cesium; said contacting in an organic amide in the presence of a dihalo aromatic compound to form a composition, and
   b. maintaining at least a portion of said composition at polymerization conditions to produce a polymer.
2. The method of claim 1 wherein the dihalo aromatic compounds are represented by the formula XRX, where R is a divalent hydrocarbon radical selected from arylene, alkyl-substituted arylene, cycloalkyl-substituted arylene, and aryl-substituted arylene, the number of carbon atoms in said R group being within the range of 6 to about 20; and X is a halogen selected from fluorine, chlorine, bromine, and iodine.
3. The method of claim 1 wherein the molar ratio of dihalo aromatic compound to alkali metal salt of halothiophenol is within the range of about 0.005:1 to about 0.1:1.
4. The method of claim 1 wherein the amount of organic amide is within the range of about 100 grams to about 2500 grams per gram-mole of alkali metal salt of halothiophenol.
5. The method of claim 1 wherein an alkali metal salt of a halothiophenol is produced in situ in the polymerization reactor by reaction of a corresponding halothiophenol with an alkali metal hydroxide.
6. The method of claim 5 wherein water is present in the polymerization reactor during the reaction of said halothiophenol and said alkali metal hydroxide.
7. The method of claim 6 wherein subsequent to the in situ production of an alkali metal salt of a halothiophenol in the polymerization reactor water is removed from the reactor prior to the addition of the dihalo aromatic compound.
8. The method of claim 7 wherein said halothiophenol is p-chlorothiophenol, said alkali metal hydroxide is sodium hydroxide, said organic amide is N-methyl-2-pyrrolidone, and said dihalo aromatic compound is p-dichlorobenzene.

* * * * *